(12) United States Patent
Pierce et al.

(10) Patent No.: US 9,090,197 B2
(45) Date of Patent: *Jul. 28, 2015

(54) HITCH MOUNTED CAMPING ASSEMBLY

(71) Applicant: GearHouse Locker, LLC, Pinellas Park, FL (US)

(72) Inventors: Skip A. Pierce, Pinellas Park, FL (US); Glen J. Lawson, Pinellas Park, FL (US)

(73) Assignee: GearHouse Locker, LLC, Pinellas Park, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/184,768

(22) Filed: Feb. 20, 2014

(65) Prior Publication Data

US 2014/0175829 A1 Jun. 26, 2014

Related U.S. Application Data

(63) Continuation of application No. 13/410,341, filed on Mar. 2, 2012, now Pat. No. 8,678,472.

(51) Int. Cl.
*B60P 3/00* (2006.01)
*B60P 3/34* (2006.01)
*E04H 15/06* (2006.01)
*B60P 3/39* (2006.01)

(52) U.S. Cl.
CPC . *B60P 3/34* (2013.01); *B60P 3/341* (2013.01); *B60P 3/39* (2013.01); *E04H 15/06* (2013.01)

(58) Field of Classification Search
CPC .................................. B60P 3/341; E04H 15/06
USPC .................................... 296/160, 161; 182/127
See application file for complete search history.

(56) References Cited

U.S. PATENT DOCUMENTS 5,878,967 A * 3/1999 Conner ........................ 241/79.1
2003/0051942 A1* 3/2003 Atkins .......................... 182/63.1

* cited by examiner

*Primary Examiner* — Joseph D Pape
(74) *Attorney, Agent, or Firm* — Monahan & Company, LLC; Timothy J. Monahan (57) ABSTRACT

A camping assembly is provided having a frame with a base and a superstructure, and a tent mounted on the frame superstructure, wherein the tent is configurable from a closed position for transport to an open position with the tent floor forming a cantilever relative to the frame. The camping assembly may be mounted on a typical vehicle trailer hitch by engaging the receiver, and braces extending from the frame superstructure to the vehicle act to stabilize the camping assembly during transport. The camping assembly may be used on or off of the vehicle. When the camping assembly is used off of the vehicle, it is supported on adjustable legs on outriggers, with the tent supported on top of the frame superstructure.

20 Claims, 7 Drawing Sheets

HITCH MOUNTED CAMPING ASSEMBLY

This invention relates to a camping assembly that can be mounted on the trailer hitch of a vehicle. The camping assembly has a frame, which supports cargo containers, and a collapsible tent mounted on the frame. The assembly can be readily detached from the vehicle and supported on adjustable legs.

BACKGROUND OF THE INVENTION

Camper units that are supported on a vehicle, rather than being towed behind the vehicle, are shown in the following references. Zentner, U.S. Pat. No. 3,185,518 discloses a camping device for use with a station wagon. The device has a rigid enclosure supported on the roof of the vehicle, which is useful as a sleeping or storage compartment. The device can be removed from the vehicle to form a free standing unit, and a protective, tent-like covering unfolds to protect the area underneath the enclosure. Henson, U.S. Pat. No. 3,337,259 discloses a mobile shelter that is supported on the rear of a vehicle. The shelter can be removed from the vehicle to form a free standing unit, and panels unfold to create a larger enclosure. Spalding, U.S. Pat. No. 3,403,935 discloses a camper unit that is supported on the rear and roof of a vehicle for transport. The camper unit can be readily removed from the vehicle and expanded to form a large enclosure to accommodate several adults. Espejo, U.S. Pat. No. 4,294,486 discloses a camper and tent unit that is supported on the rear bumper and roof of a vehicle. The unit can be removed from the vehicle and expanded to form a tent, complete with housing and flooring.

Various roof-top tents for vehicles are known. The tents are collapsible, to minimize drag, when the vehicle is in motion, and expandable for use. Fagan, U.S. Pat. No. 3,623,762 discloses a "penthouse" car camper, which includes a ladder connected to the rear of the camper platform. Franzen, U.S. Pat. No. 3,712,315 discloses an expandable roof-top tent with a side panel extension, which provides additional shelter at the rear of the vehicle. Barr et al., U.S. Pat. No. 4,058,133 disclose a roof-top tent, collapsible into a clamshell type structure for travelling. The tent expands sideways for use, and a cantilever portion of the tent is supported by a telescopic leg. Rizzotto, Sr., U.S. Pat. No. 4,111,479 discloses a roof-top tent, collapsible into a clamshell type structure that overhangs the front of the vehicle when expanded.

Hitch mounted cargo carriers for vehicles are known. Myrex, US 2009/0159627 A1 discloses a hitch mounted cargo carrier with retractable wheels. The wheels are connected to rotatably mounted legs. The wheels can be lowered, to allow the cargo carrier to be easily moved, when the carrier is not attached to a vehicle.

Despite the various attempts to provide a convenient camping assembly, there remains a need for an apparatus that is relatively lightweight, is aerodynamic during transport, does not interfere with a driver's visibility, has the advantages of a roof-top tent—yet does not need to be attached to a vehicle during use, is readily connected to and disengaged from a vehicle, is compatible with a standard trailer hitch, and is configurable to accommodate a variety of cargo storage options.

SUMMARY OF THE INVENTION

The present invention is a transportable camping assembly for providing shelter and storing cargo. The assembly can be mounted on the rear of a vehicle, for example, on a trailer hitch, such as standard trailer hitch attached to the underside of a vehicle. The camping assembly has a frame, with a base and a superstructure extending upward from the base. The frame may be made from metal bars, such as angle iron, which are fastened together. For example, the components of the frame may be welded or bolted together.

The camping assembly is provided with a mounting member, which supports the camping assembly on the rear of a vehicle. In one embodiment, the mounting member engages the frame of the camping assembly and the receiver of a trailer hitch. For example, a typical trailer hitch comprises a receiver having a hollow shaft with a rectangular cross section, attached to the underside of a vehicle, and the mounting member includes a shaft, which can be inserted into the receiver.

The mounting member may have multiple, interlocking components. For example, the mounting member may have a support plate that remains engaged with the trailer hitch, when the frame is removed from the vehicle, and corresponding guides and support structures located on the base of the frame, which are mateable with the support plate. The support plate may be provided with a shaft, which is inserted in the hitch receiver. The support plate may have a tapered end (opposite the rear of the vehicle) for easy insertion into the mateable portion of the base, or vice versa, that is, the support plate may constitute the "female" component of a male-female connector.

The frame may be configured to accommodate virtually any shape of cargo or container for cargo. By way of example, the base and superstructure of the frame may have shelves, hooks or other structures to support built-in storage lockers, ice chests, water coolers, sporting goods, cooking implements and stoves, etc.

A tent is mounted on the top of the superstructure of the frame. The tent is configurable from a collapsed state for transport, to an open position for use, that is, to provide shelter and/or sleeping accommodations for one or more persons. When the tent is open, the floor of the tent has a greater area than when the tent is collapsed for transport. For example, the tent may collapse into a "clam shell" or "suitcase" configuration, with the floor area approximately doubling when the tent is opened for use. The upper portion of the tent forming the walls and roof of the tent, or the dome of the tent, may be constructed of a flexible sheet, such as a textile fabric.

In one embodiment of the invention, the weight of the tent is substantially balanced on the frame superstructure, when the tent is collapsed, for example, centered on the cross-sectional area of the top of the superstructure. When the tent is opened, a portion of the floor creates a cantilever, with respect to the frame superstructure. Consequently, it is necessary to provide additional structural support for the floor, to use the tent. A floor support member is provided underneath the cantilevered portion of the floor, which extends from the floor of the tent to the ground. For example, the support member may be an upright, telescopic or foldable leg extending from the floor to the ground. By way of further example, the floor support member may be a ladder, having an upper end connectable to the floor of the tent and a lower end resting on the ground. An advantage of the present invention is that the tent may be used, while mounted on the superstructure, regardless of whether the camping assembly is mounted on the vehicle or disengaged from the vehicle.

The camping assembly is mounted on the rear of a vehicle for transport, whereby the base of the frame is supported by the mounting member. Additionally, at least one brace, preferably at least two braces, extend from the superstructure of the frame to engage the rear of the vehicle, thereby stabilizing the camping assembly. The braces may be rigid bars or flexible straps, depending on the type of vehicle.

In one embodiment of the invention, the vehicle may be a pickup truck having side rails with holes positioned in the top of the rails. A stabilizer bar having downwardly extending dowels may be employed, whereby the dowels are inserted in the holes in the truck side rails, with the bar extending horizontally across the rear of the pickup truck, along the top of the tailgate. The brace(s) extend from the superstructure of the camping assembly and are connected to the stabilizer bar.

The camping assembly may also include one or more arms, extending in a downward direction, for example at an angle of 30° to 60°, from the vehicle to the superstructure of the frame, for partially supporting the weight of the camping assembly and for providing additional stability. For example, the upper end of the arm(s) may be connected to a stabilizer bar and a lower end of the arms may be connected to the superstructure of the frame.

When the camping assembly is detached from a vehicle, it may be supported above the ground on a plurality of height-adjustable legs. For example, the base may have at least two, three or, preferably, four adjustable legs, connected to the frame. The legs may be retractable or readily detachable from the frame, when not in use. Each of the legs has a foot on the bottom, and the foot rests on the ground, supporting the frame at the desired height. At least one of the legs has a foot in a position extended from the frame in the direction of the tent floor cantilever, when the tent is in an open configuration, thereby counteracting rotation of the camping assembly in the direction of the cantilever.

In one embodiment of the invention, the camping assembly may be provided with one or more outriggers, for supporting a leg at a distance away from the frame, thereby providing additional stability for the camping assembly, when it is disconnected from a vehicle. For example, one or a pair of outrigger(s) may be used to each position a leg away from the frame, in the direction of the cantilevered portion of the tent floor, to counteract rotational force of the cantilever on the frame. The outrigger(s) may be pivotally attached to the frame, or able to slide relative to the frame, or detachable from the frame, when not in use. In one embodiment of the invention, the camping assembly is provided with four legs and each of the legs is supported on an outrigger, at a distance of from one to twelve feet from the frame.

DETAILED DESCRIPTION OF THE INVENTION

Without limiting the scope of the invention, the preferred embodiments and features are hereinafter set forth. All of the United States patents that are cited in the specification are hereby incorporated by reference.

Figure 1:
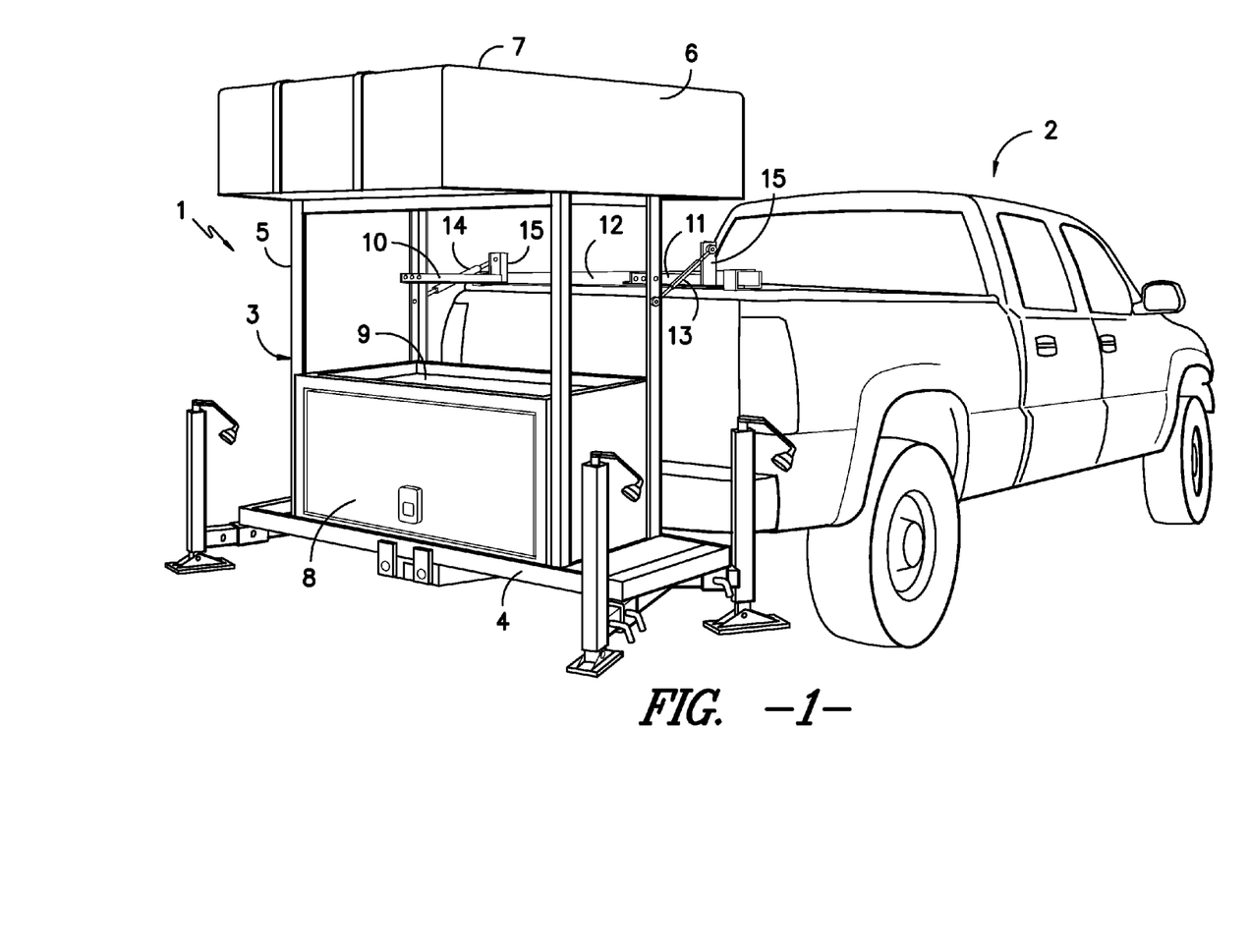
FIG. 1 is perspective view of the camping assembly mounted on the rear of a vehicle for transport.

Referring to FIG. 1, camping assembly 1 is shown mounted on the rear of vehicle 2, for transport. Frame 3 has base 4 and superstructure 5, extending upward from base 4. Tent 6 is shown in its collapsed configuration, mounted on superstructure 5. Removable cover 7 protects tent 6 from rain, bugs, road debris, etc. Camping assembly 1 is depicted with storage container 8, supported by frame 3. Shelf 9 provides additional space for cargo or containers for cargo.

The dimensions of frame and the materials of construction may vary according to the cargo storage requirements, weight considerations and size and type of vehicle. By way of example, base 4 may have a rectangular shape, with a width (measured parallel to the rear of the vehicle) of 48 to 84 inches, preferable 54 to 78 inches, a depth (measured perpendicular to the rear of the vehicle) of 12 to 48 inches, preferably 16 to 30 inches, and a height of 1 to 12 inches. Superstructure 5 may have a rectangular prism shape, with a width (measured parallel to the rear of a vehicle) of from 24 to 72 inches, preferably from 36 to 54 inches, a depth (measured perpendicular to the rear of a vehicle) of from 12 to 48 inches, preferably from 16 to 30 inches, and a height of 36 to 72 inches, preferably 42 to 60 inches. In one embodiment of the invention, the area of the base of frame 3 ranges from six to eighteen $ft^2$. Suitable materials of construction include steel, aluminum, carbon fiber composites, magnesium and titanium, as well as mixtures and alloys thereof.

In one embodiment of the invention, camping assembly 1 is mounted on vehicle 2, and the cargo containers and cargo is arranged on frame 3 to provide an unobstructed view through a driver's rearview mirror inside the vehicle. An "unobstructed" view is intended to mean that the camping assembly does interpose any material, including transparent materials, such as glass, between the vehicle and a line-of-sight from the rearview mirror through the superstructure of the camping assembly.

Braces 10 and 11 extend from superstructure 5 and are connected to stabilizing bar 12. Braces 10 and 11 are spaced apart horizontally, relative to the rear of vehicle 2, to counteract rotational force in a plane parallel to the rear of vehicle 2. Additionally, braces 10 and 11 counteract rotational force of camping assembly 1 in a plane perpendicular to the rear of vehicle 2. Braces 10 and 11 may extend horizontally from frame 3 to vehicle 2, or the braces may be at an angle, for example, at an angle of 30° to 60° extending upward from the superstructure to the vehicle.

Figure 2:
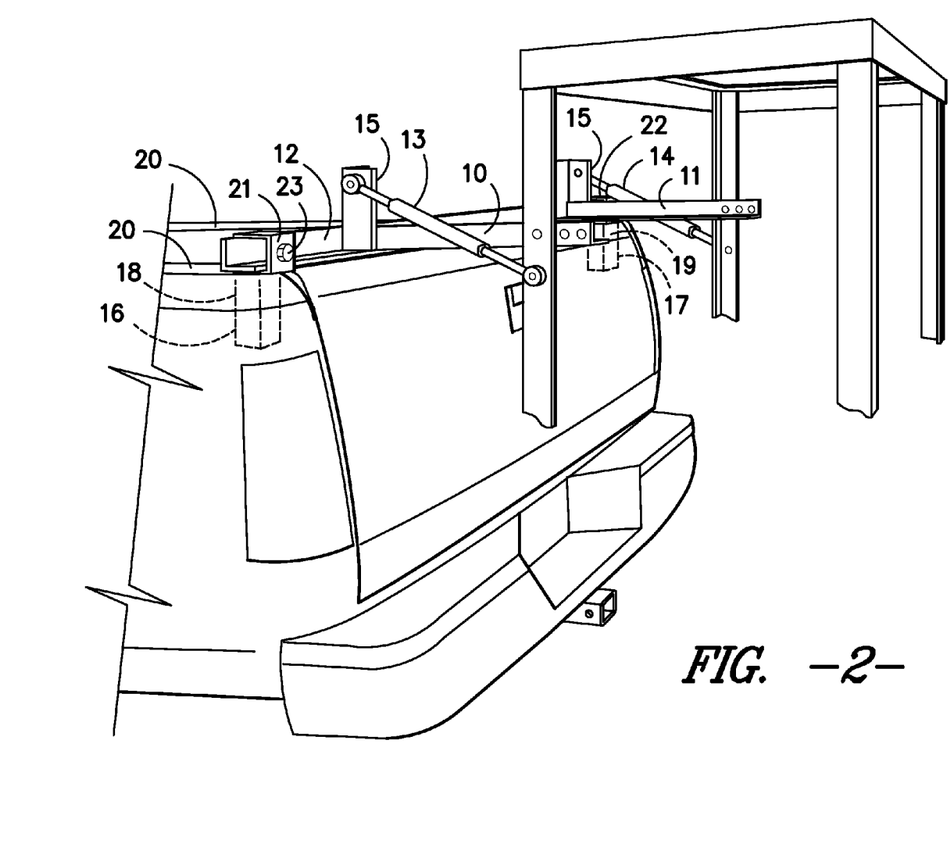
FIG. 2 is a perspective view of the bracing securing the frame to the rear of the vehicle for transport.

Camping assembly 1 may be provided with a second pair of support members or arms, in addition to braces 10 and 11. Referring to FIGS. 1 and 2, arms 13 and 14 are connected at one end to superstructure 5 and at an opposite end to upright 15 of stabilizer bar 12. Braces 10 and 11 cooperate with arms 13 and 14, respectively, to stabilize and partially support the weight of camping assembly 1. In one embodiment of the invention, braces 10 and 11 are horizontal, whereas arms 13 and 14 extend upward from superstructure 5 to stabilizer bar 12 at an angle of 30° to 60°. Arms 13 and 14 may be adjustable turnbuckles.

Referring to FIG. 2, the view depicts stabilizer bar 12 with dowels 16 and 17, which are inserted in corresponding holes 18 and 19 in the rear of side rail 20 of vehicle 2. Dowels 16 and 17 are attached to adjustable brackets 21 and 22, respectively. Brackets 21 and 22 can slide along the length of stabilizer bar 12, which allows the dowels to align with holes in the side rails of trucks having various widths and configurations. Brackets 21 and 22 are secured in place, in the desired location, for example, by bolts 23.

Braces 10 and 11 and arms 13 and 14 can be readily disconnected from stabilizer bar 12, when it is desirable to disconnect camping assembly 1 from vehicle 2. By way of example, the braces and arms may be unbolted, or the pins connecting the braces and arms to the stabilizer bar can be removed, to disconnect the camping assembly from the vehicle. Alternatively, the braces and arms can be disconnected from their point of attachment to the frame superstructure. The length of the braces and the arms and their points of attachment to the superstructure and the stabilizer bar are adjustable, to accommodate various vehicle and camping assembly dimensions.

In an alternative embodiment of the invention, superstructure 5 of frame 3 may be connected to vehicle 2 by flexible braces, such as tie down straps, in particular tie down straps that include a ratcheting mechanism to tighten the connection. Flexible braces are particularly useful for securing the frame of the camping assembly to a variety of vehicles, such as sport utility vehicle (SUV), van, minivan, station wagon, crossover, sedan or other automobile, capable of supporting the weight of the camping assembly. For example, the flexible braces may be connected to a roof rack or luggage rack on a vehicle, at two, horizontally spaced apart locations.

Figure 3:
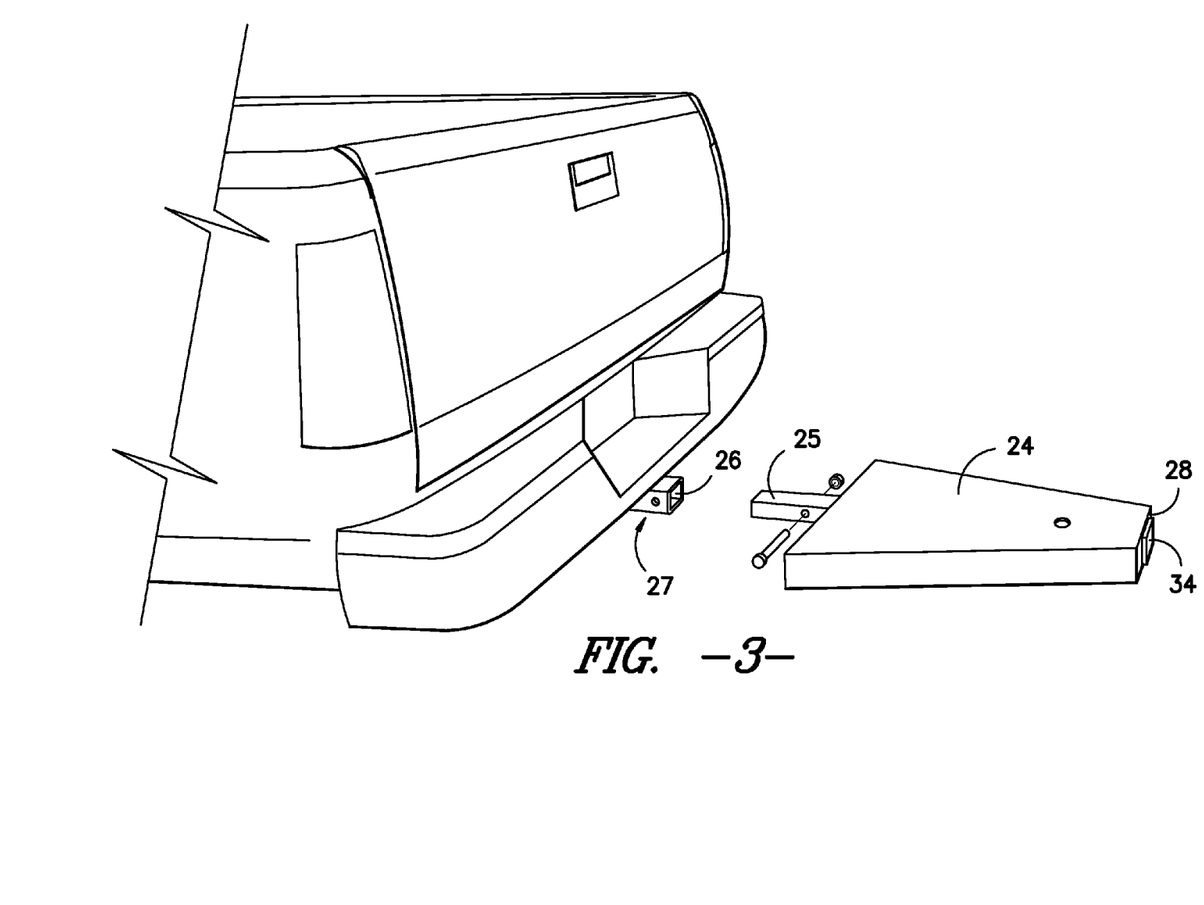
FIG. 3 is a perspective view of the support plate for mounting the camping assembly on the rear of a vehicle.
Figure 4:
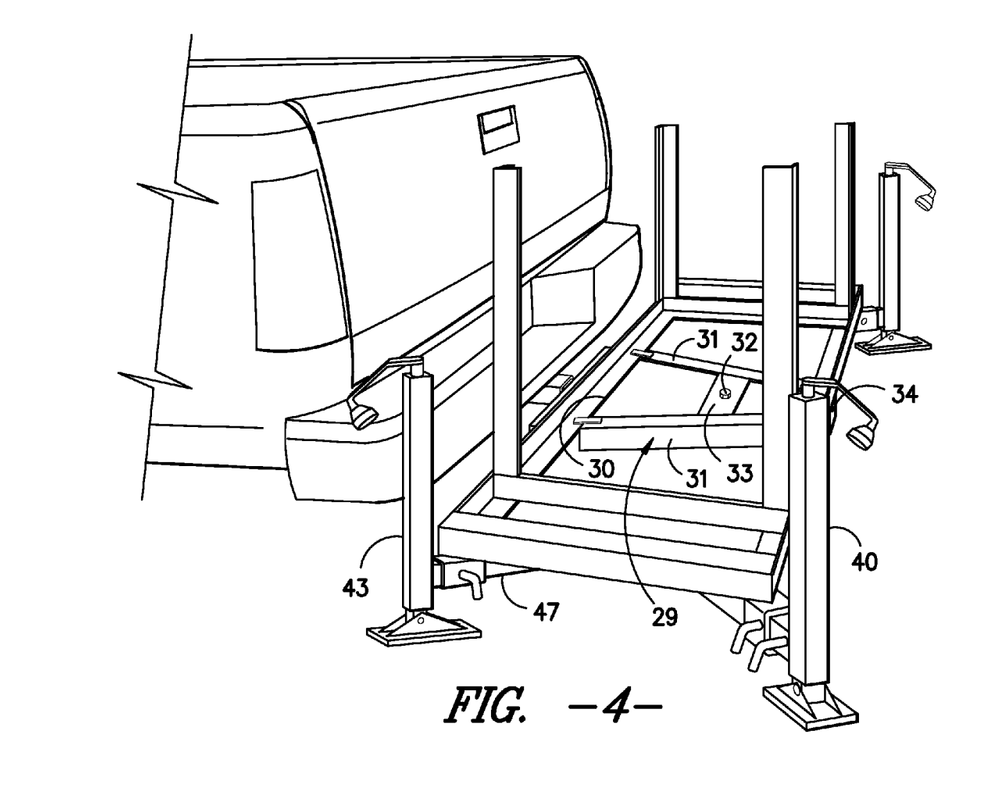
FIG. 4 is a perspective view of the base of the frame, which overlays the support plate, when the camping assembly is mounted on a vehicle.

Referring to FIGS. 3 and 4, the mounting member for supporting the camping assembly on the rear of a vehicle is depicted. Support plate 24 has shaft 25 inserted into receiver 26 of trailer hitch 27. Support plate 24 has a tapered end 28, extending rearward from trailer hitch 27 and the rear of vehicle 2. Base 4 of frame 3 is provided with base mount 29, which is mateable with and overlays support plate 24, when camping assembly 1 is mounted on a vehicle. Base mount 29 has a flared end 30 and guides 31, to assist mounting camping assembly 1 on vehicle 2, for example, by backing up the vehicle to where the camping assembly is standing. The alignment between the camping assembly and the vehicle does not need to be perfect, and the camping assembly can shift slightly as support plate 24 is forced into engagement with base mount 29. Once base mount 29 is in position overlaying support plate 24, the two components can be secured together, for example, by bolt 32 and crossbar 33, as shown in FIG. 4. Pins, clamps or other means for temporarily securing one flat plate to another may be used in place of bolt 32 and crossbar 33. It may be understood that while support plate 24 and base mount 29 are shown as planar structures, either structure may be a frame, such as could be made of angle iron, with the corresponding structures temporarily secured at points along the frame.

Alternatively, the mounting member may be a shaft that is attached to base 4 of frame 3, and the shaft is directly inserted into receiver 26 of trailer hitch 27. Receiver 26 may be provided with a flared end to guide insertion of a shaft (not shown). In another example, the trailer hitch could be pivotable, relative to the vehicle, to facilitate insertion of a shaft.

The mounting member may itself be provided with a receiver, for engaging a shaft. Referring to FIG. 3, support plate 24 has receiver 34, for connection to ancillary equipment, such as a bicycle storage rack.

Figure 5:
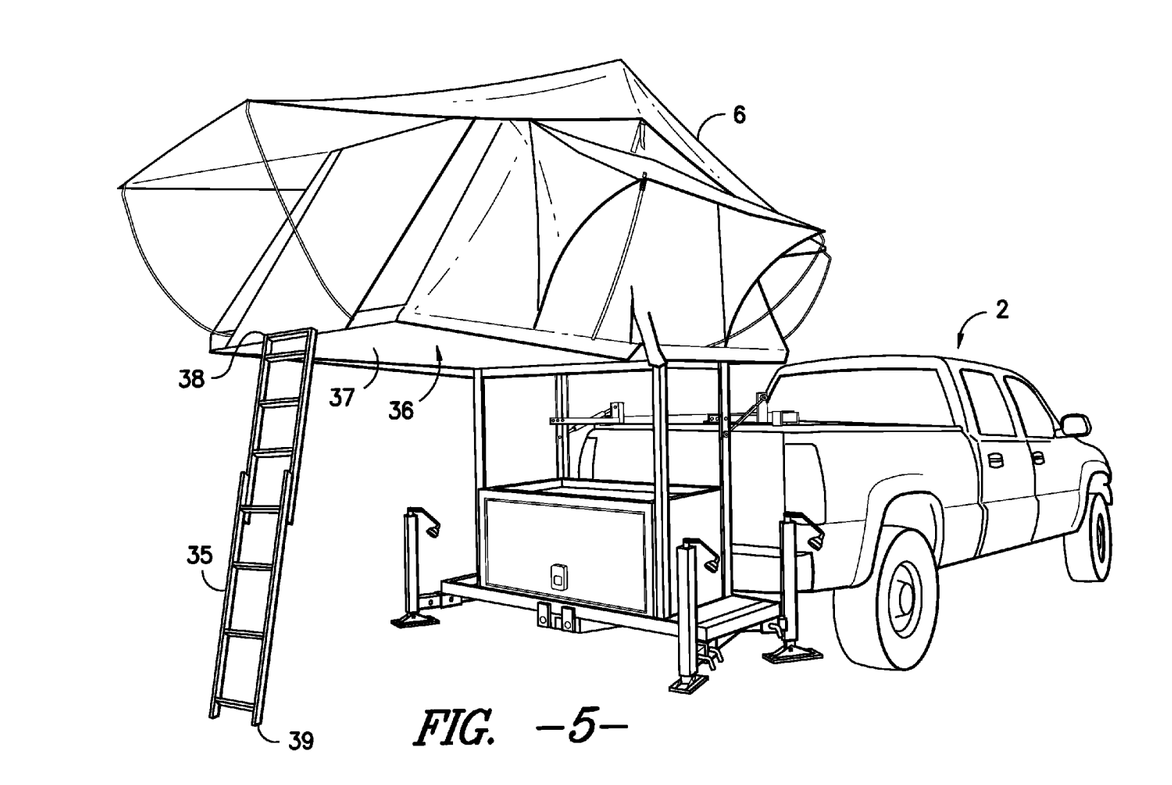
FIG. 5 is a perspective view of the camping assembly mounted on a vehicle, with the tent open and ladder deployed.

In FIG. 5, camping assembly 1 is depicted with tent 6 in its open configuration, while the camping assembly remains mounted on vehicle 2. During transport, while tent 6 is collapsed, ladder 35 is stored under cover 7. Ladder 35 may be constructed with multiple segments, to allow the ladder to be folded or collapsed for storage and unfolded or telescoped for use. Ladder 35 may also be provided as separate, interlocking units that can be assembled for use.

In an open configuration, floor 36 of tent 6 has cantilever 37, extending outward from frame 3. An upper end 38 of ladder 35 is pivotally connected to cantilever 37 of floor 36, and a lower end 39 of ladder 35 rests on the ground. In the embodiment shown, ladder 35 serves the dual function of providing access to the entrance of tent 6, as well as acting as a means for supporting cantilever 37 of floor 36. In an alternative embodiment, one or more supporting legs, which extend from floor 36 of tent 6 to the ground, could be employed beneath cantilever 37, in addition to or in place of ladder 35.

While camping assembly 1 is illustrated with the entrance of tent 6 positioned above cantilever 37 of floor 36, and the cantilever extending rearward from frame 3 (away from the vehicle), other arrangements are intended to be within the scope of the present invention. For example, the entrance to tent 6 may be above the stationary portion of floor 36, that is, the portion of floor 36 attached to frame 3. In other embodiments of the invention, tent 6 may unfold so that cantilever 37 extends from one or the other of the sides of frame 3 or extends forward towards the vehicle.

Generally, for a tent to accommodate at least two adults, it is desirable to have at least 25 ft$^2$ of floor space, preferably at least 30 ft$^2$ of floor space. Nevertheless, when camping assembly 1 is being transported, tent 6 is placed in a collapsed configuration, to improve aerodynamics, protect the tent from the elements and minimize space. Tent 6 may be folded into a suitcase or clamshell configuration, whereby the "footprint" of the floor of the tent is approximately doubled (increased by 100%) when the tent is opened for use. Other configurations to reduce the footprint of the floor of the tent for transportation may be employed. For example, the tent may be folded into a configuration, whereby the footprint of the floor of the tent is increased by 50% or more, 80% or more, or even 150% or more, when the tent is opened for use. The materials of construction and design of collapsible tents are known to those skilled in the art. For example, ripstop nylon supported by aluminum poles may be used.

Figure 6:
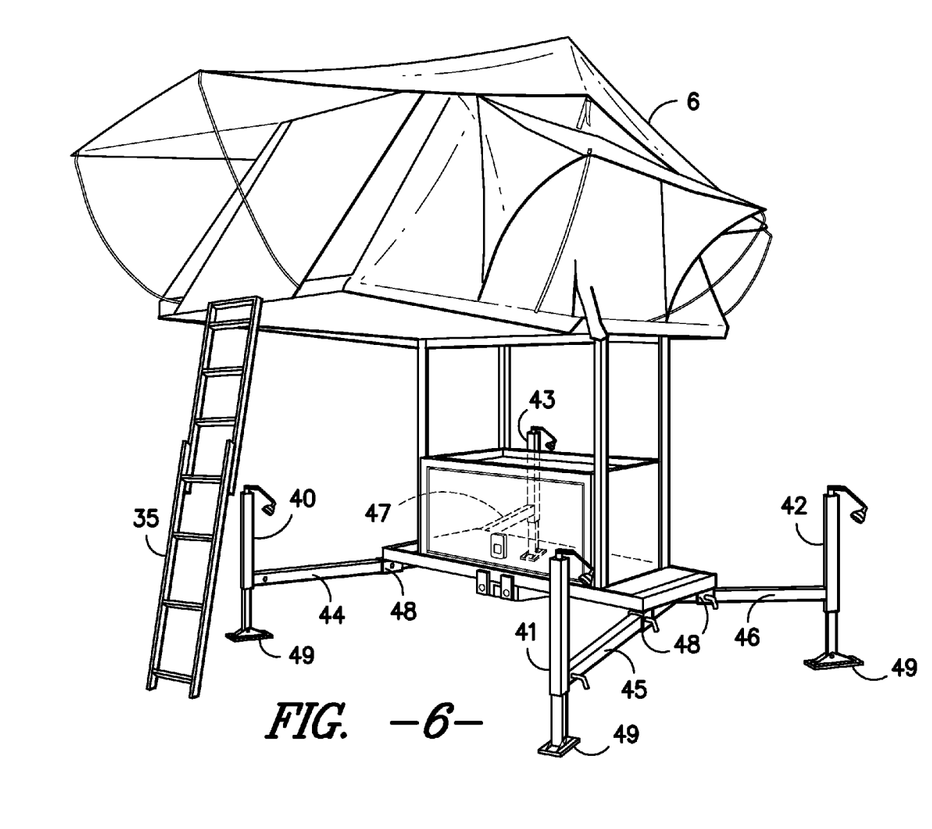
FIG. 6 is a perspective view of the camping assembly in self-supporting mode, with outriggers supporting the legs.

When tent 6 is used while camping assembly 1 is supported on trailer hitch 27 of vehicle 2, the only additional support required is underneath cantilever 37, such as ladder 35. Nevertheless, while frame 3 has the advantage of being compact for ease of transport, additional support is beneficial when camping assembly 1 is in its self-supporting mode, that is, detached from the vehicle. In FIG. 6, camping assembly 1 is depicted in its self-supporting mode. This feature of the invention is particularly convenient when it is desirable to leave the camping assembly at a campground, while using the vehicle for another purpose.

Camping assembly 1 is supported in a level position by at least three adjustable legs. At least one of the legs is supported by an outrigger, such as a bar. The outrigger has one end connected to the frame of the camping assembly and an opposite end supporting the leg, whereby the outrigger extends from the frame in the direction of the cantilever portion of the floor, thereby counteracting the rotational force of the cantilever. An outrigger capable of supporting a leg a distance of at least one foot, preferably at least two feet, from the frame adds stability to the camping assembly. The other two legs may be connected directly to the frame or may be supported on outriggers, as well.

In one embodiment of the invention, camping assembly 1 has four adjustable legs and at least two of the adjustable legs are supported on outriggers extending from the frame, in the direction of the cantilever floor of the tent. FIG. 6 depicts a camping assembly having four adjustable legs 40, 41, 42 and 43, wherein the legs are supported on outriggers 44, 45, 46 and 47, respectively. The outriggers extend away from frame 3, with the legs connected to the outriggers located on the cantilever side of the frame positioned at a distance from the frame ranging from one to twelve feet in length, preferably two to ten feet in length, and the legs connected to the outriggers located opposite the cantilever side of the frame positioned at a distance ranging from one to eight feet in length.

The outriggers may be pivotally attached to frame 3 and swung into position, as needed. Alternatively, the outriggers may be retracted by sliding the outriggers within sleeves 48 under frame 3 when not in use. In another alternative arrangement, the outriggers may be held in place by pins and detached from frame 3 and stored, for example, on the vehicle, when not in use.

Various mechanisms may be employed to adjust the supporting legs. For example, the legs may telescope and be held in place by pins, or screw jacks may be used, or some combination of telescoping legs and screw jacks may be used. The adjustable legs may be retractable, for example, by pivoting to be parallel to the ground when not in use, or the legs may be detachable from the frame or outriggers, when not needed. The legs can be provided with feet 49, to increase the area in contact with the ground, thereby increasing the stability of the camping assembly.

Figure 7:
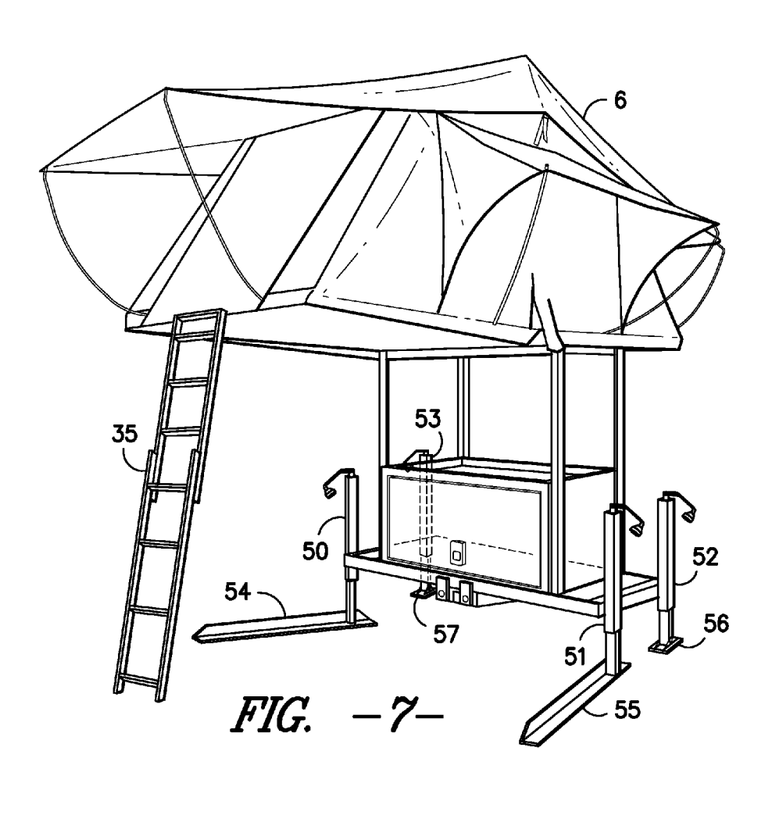
FIG. 7 is a perspective view of the camping assembly in self-supporting mode, with two of the legs having extended feet.

Referring to FIG. 7, an alternative embodiment of the camping assembly in self-supporting mode is shown. Adjustable legs 50, 51, 52 and 53 are connected directly to frame 3. Adjustable legs 50 and 51 have feet 54 and 55, respectively, extending from the cantilever side of frame 3, to counteract rotation of the camping assembly. By way of example, feet 54 and 55 may be from one to twelve feet in length, preferably from two to five feet in length. Legs 52 and 53 located on the opposite side of frame 3 from the cantilever are provided with typically sized support feet 56 and 57, for example, feet having an area of from six to twenty-four inch$^2$. Optionally, both of feet 56 and 57 may extend up to six feet from frame 3.

In one embodiment of the invention, tent 6 is supported at least four feet above the ground, preferably at least six feet above the ground, when camping assembly 1 is in self-supporting mode.

The present invention has numerous advantages, relative to the prior art, by combining one or more of the following features in a single, camping assembly. The camping assembly provides a collapsible, above-ground tent, which can be used when the camping assembly is mounted on a vehicle or is free-standing. The camping assembly can be mounted on the rear of a vehicle by engaging the receiver of a standard trailer hitch, which together with a pair of braces extending from the frame to the vehicle creates a three-point connection for exceptional stability. The camping assembly is lightweight, aerodynamic and does not interfere with a driver's visibility during transport. When used in conjunction with a truck, the bed of the truck remains open for other uses, such as for storing gear, four-wheelers, motorcycles, etc. If desired, the camping assembly can be configured to be less than eighteen inches above, at or below the roof line of a vehicle, allowing the vehicle and camping assembly to pass under relatively low obstructions, such as a drive-thru or parking garage. The camping assembly has a low center of gravity, is compact and does not interfere with operation of the vehicle. The vehicle and camping assembly can typically be parked in a single parking space or standard home garage. The camping assembly can be readily connected to and disengaged from a vehicle. When the camping assembly is free-standing, the adjustable legs, in combination with outriggers, can be used to accommodate uneven terrain and maintain stability. The advantage of an elevated tent is particularly important in case of unexpected severe weather conditions, when the available space may be wet, muddy or otherwise unfit for supporting a tent. The camping assembly has no wheels and a low center of gravity, which allows the vehicle and the camping assembly to function as a single unit.

The invention may be further understood by reference to the following claims.

What we claim is:

1. A transportable camping assembly for storing cargo and providing shelter, which can be mounted on a vehicle trailer hitch, comprising:
    (a) a frame, having a base and a superstructure extending upward from the base, the superstructure having a top;
    (b) a mounting member connected to the base of the frame whereby the camping assembly can be mounted on the trailer hitch of the vehicle with the camping assembly supported off of the ground and with the camping assembly not supported on wheels;
    (c) a tent mounted on the superstructure of the frame, the tent having an entrance and a floor, the floor having a first portion and a second portion, whereby the tent is configurable from a closed position for transport to an open position for use, with the tent balanced on the top of the superstructure when the tent is in the closed position, and with the first portion of the floor overlaying the superstructure and the second portion of the floor forming a cantilever relative to the superstructure when the tent is in the open position; and
    (d) a ladder for providing access to the entrance of the tent.

2. The camping assembly of claim 1, wherein the ladder is positioned underneath the second portion of the floor forming a cantilever thereby supporting the floor, when the tent is in the open position.

3. The camping assembly of claim 2, wherein the ladder extends from the floor of the tent to the ground.

4. The camping assembly of claim 1, wherein the camping assembly is self-supporting on the ground when not mounted on the vehicle, with the floor of the tent at least four feet above the ground.

5. The camping assembly of claim 4, wherein the superstructure of the frame has a height of from 36 to 72 inches.

6. The camping assembly of claim 1, wherein the tent is centered on a cross-sectional area of the top of the superstructure, when the tent is in the closed position.

7. The camping assembly of claim 1, wherein the tent is folded in a clam-shell configuration when closed, with the second portion of the floor overlaying the first portion of the floor of the tent.

8. The camping assembly of claim 7, wherein the area covered by the second portion of the floor is 50% or more of the area covered by the first portion of the floor, when the tent is configured in the open position.

9. The camping assembly of claim 1, further comprising a plurality of height-adjustable legs attached to the frame, for supporting the camping assembly when the camping assembly is not mounted on the vehicle.

10. The camping assembly of claim 1, comprising at least three height-adjustable legs, wherein at least one of the legs is supported on an outrigger extending from the frame in the direction of the tent floor cantilever, when the camping assembly is not mounted on the vehicle and the tent is in the open position, thereby counteracting the rotational force of the cantilever.

11. A transportable camping assembly for storing cargo and providing shelter, which can be mounted on a vehicle trailer hitch, comprising:
    (a) a frame, having a base and a superstructure extending upward from the base, the superstructure having a top;

(b) a mounting member connected to the base of the frame whereby the camping assembly can be mounted on the trailer hitch of the vehicle with the camping assembly supported off of the ground and with the camping assembly not supported on wheels, wherein the mounting member comprises a shaft and the trailer hitch comprises a receiver for engaging the shaft;

(c) a shelter for providing sleeping accommodations for one or more persons mounted on the top of the superstructure, the structure having an entrance;

(d) a ladder for providing access to the entrance of the shelter;

(e) at least three height-adjustable legs mounted on the frame, for supporting the camping assembly in a level orientation when the camping assembly is not mounted on the vehicle, whereby at least one of the legs is supported on an outrigger extending from the frame a distance of at least one foot and is capable of stabilizing the camping assembly.

12. The camping assembly of claim 11, comprising at least four height-adjustable legs, wherein at least two of the legs are each supported on an outrigger extending from the frame at a distance of from 1 to 12 feet, for supporting the camping assembly when the camping assembly is not mounted on the vehicle.

13. The camping assembly of claim 12, wherein the camping assembly is self-supporting on the ground when not mounted on the vehicle, with the shelter at least four feet above the ground.

14. The camping assembly of claim 11, wherein the shelter comprises a floor and a portion of the floor forms a cantilever relative to the superstructure of the frame, and the ladder is positioned underneath the portion of the floor forming the cantilever thereby supporting the floor.

15. The camping assembly of claim 11, wherein the shelter is balanced on the top of the frame superstructure.

16. A transportable camping assembly for storing cargo and providing shelter, which can be mounted on a vehicle trailer hitch, comprising:

(a) a frame, having a base and a superstructure extending upward from the base, the superstructure having a rectangular cross-section with a width of from 24 to 72 inches and a depth of from 12 to 48 inches, the superstructure further having a top;

(b) a mounting member connected to the base of the frame whereby the camping assembly can be mounted on the trailer hitch of the vehicle with the camping assembly supported off of the ground and with the camping assembly not supported on wheels;

(c) a shelter for providing sleeping accommodations for one or more persons balanced on the top of the superstructure, the structure having an entrance;

(d) a ladder for providing access to the entrance of the shelter; and (e) a brace having a first end connected to the frame and a second end connected to the vehicle when the assembly is mounted on the vehicle, whereby the brace is positioned to counteract movement of the camping assembly relative to the vehicle.

17. The camping assembly of claim 16, wherein the frame superstructure has a height of from 36 to 72 inches and has the shape of a rectangular prism.

18. The camping assembly of claim 16, wherein the camping assembly is configured to provide a vehicle driver with an unobstructed line-of-sight from a vehicle rearview mirror through the camping assembly, when the camping assembly is mounted on a vehicle.

19. The camping assembly of claim 16, wherein the camping assembly is self-supporting on the ground when not mounted on the vehicle, with the shelter at least four feet above the ground.

20. The camping assembly of claim 16 further comprising at least three height-adjustable legs mounted on the frame, for supporting the camping assembly in a level orientation when the camping assembly is not mounted on the vehicle, whereby at least one of the legs is supported on an outrigger extending from the frame a distance of at least one foot and is capable of stabilizing the camping assembly.

* * * * *